United States Patent [19]

Nishida

[11] Patent Number: 4,742,521
[45] Date of Patent: May 3, 1988

[54] BAR CORD INFORMATION INPUT CONFIRMING METHOD

[75] Inventor: Manabu Nishida, Shizuoka, Japan

[73] Assignee: Tokyo Electric Co., Ltd., Tokyo, Japan

[21] Appl. No.: 94,094

[22] Filed: Sep. 4, 1987

Related U.S. Application Data

[63] Continuation of Ser. No. 754,219, Jul. 12, 1985, abandoned.

[30] Foreign Application Priority Data

Jul. 12, 1984 [JP]   Japan ................................ 59-145055

[51] Int. Cl.[4] ............................................. G06F 11/10
[52] U.S. Cl. ...................................... 371/54; 235/437
[58] Field of Search ................... 371/53, 54; 235/431, 235/462, 470, 437; 382/57

[56] References Cited

U.S. PATENT DOCUMENTS

| | | | |
|---|---|---|---|
| 2,888,199 | 5/1959 | Reumermann et al. | 371/53 |
| 3,098,994 | 7/1963 | Brown, Jr. | 371/53 |
| 3,418,630 | 12/1968 | Van Duuren | 371/39 |
| 3,753,227 | 8/1973 | Patel | 371/53 X |
| 4,085,670 | 4/1978 | Poole | 371/54 X |
| 4,265,173 | 5/1981 | Takahashi et al. | 371/54 X |
| 4,440,248 | 4/1984 | Teraoka | 235/462 X |

Primary Examiner—Charles E. Atkinson
Attorney, Agent, or Firm—Oblon, Fisher, Spivak, McClelland & Maier

[57] ABSTRACT

A method and apparatus for confirming bar code information in a bar code printer. The information to be printed includes informational digits and two check digits. The first check digit is manually inputted by the operator along with the informational digits. The second check digit is automatically calculated and should have the same value as the first check digit. The data is further confirmed by comparing the first check digit with a calculated value obtained by performing an automatic calculation based on the informational digits.

2 Claims, 10 Drawing Sheets

FIG. 3

| DATA AREA | | | |
|---|---|---|---|
| $C_1, C_2, \text{-----} C_{n-1}$ | $C_n$ | AC | |
| $I_1, I_2 \text{-----} I_{m-1}$ | $I_m$ | AI | |
| ERR F | ISSU OK F | INIT F | SET F |
| REG F | COUNT F | DP F | PRIC F |
| | | | |

BAR CORD INFORMATION INPUT CONFIRMING METHOD

This application is a continuation of application Ser. No. 06/754,219, filed on July 12, 1985, now abandoned.

FIELD OF THE INVENTION

This invention relates to a bar code information inputting method which can check for the presence or absence of an input error or errors upon the input of data in a bar code printer.

OBJECTS OF THE INVENTION

It is an object of the present invention to provide a bar code information inputting method which can check for input error or errors upon the input of bar code data.

DESCRIPTION OF THE DRAWINGS

FIG. 3 is a ram map.

PRIOR ART

Figure 1:
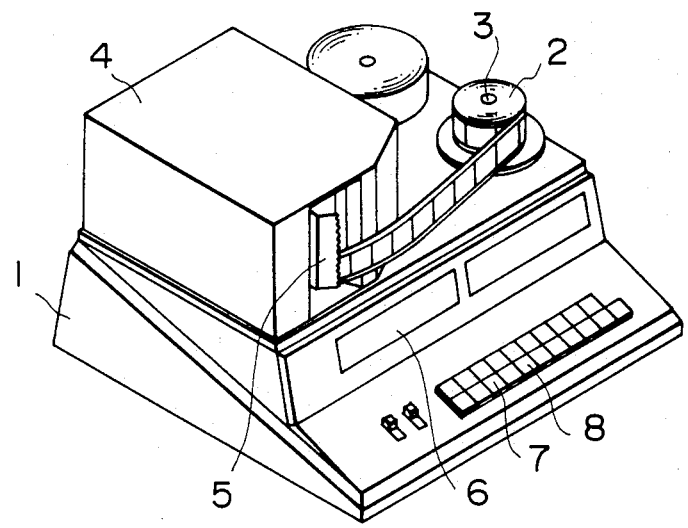
FIG. 1 is a perspective view of a bar code printer.

Generally, for bar code systems, each country provides its own standards, and in each of such standards, in order to check for read errors upon reading bar codes, a check digit is set so that the results of readings may be checked under predetermined rules. However, while, upon issuing bar code labels, pieces of bar code information are inputted manually one after another, input errors are not particularly checked. Accordingly, trouble can arise due to input errors, and thus bar code information having erroneous contents are readily printed.

EMBODIMENT OF THE INVENTION

A bar code printer 1 is provided, and a holding section 3 for holding label paper 2 wound thereon is located on an upper face of the bar code printer 1 while a printer section 4 is located in juxtaposed relationship thereto. A label issuing port 5 is formed at the front of the printer section 4. A display section 6 and a keyboard 7 are located forwardly of the bar code printer 1. The keyboard 7 includes thereon ten keys and additional various keys 8 such as an issue number key, a price key, a department key, a stop key, a register key, an issue key, and a fixed quantity issue key.

Figure 2:
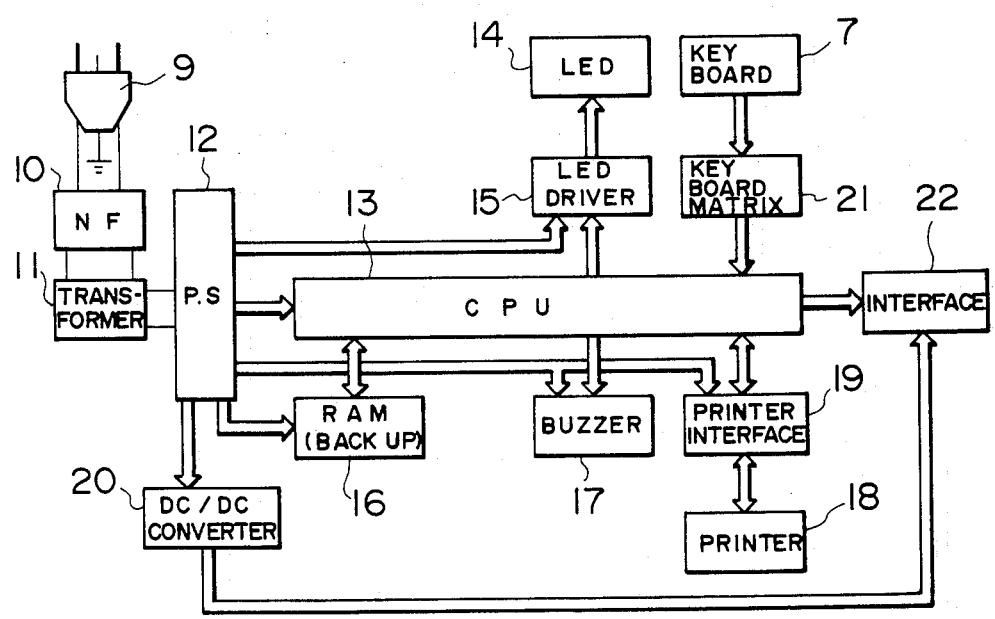
FIG. 2 is a block diagram of an internal circuit.

As shown in FIG. 2, a power supply station 12 is connected to a power source 9 via a noise filter 10 and a transformer 11 and also to a CPU 13, an LED driver 15 connected to an LED 14, a RAM 16, a buzzer 17, a printer interface 19 connected to a printer 18, and a DC/DC converter 20. The keyboard 7 is connected to the CPU 13 via a keyboard matrix 21. The CPU 13 is connected to the LED driver 15, another interface 22, the printer interface 19, the RAM, and the buzzer 17.

While a common bar code format consists conventionally of up to 19 items, the following description will be given as it consists of up to 6 items of characters and one item of a check digit for simplification of description. For example, it may be

C1, C2, C3, C4, C5, C6, C/D where C1 to C6 are each bar code information. Here, when it is assumed that the bar code information is "3 4 6 8 0 5", according to a conventional calculating method, a check digit will be calculated as follows:

|   | C1 | C2 | C3 | C4 | C5 | C6 |
|---|----|----|----|----|----|----|
|   | 3  | 1  | 6  | 8  | 0  | 5  |
| × | 1  | 2  | 1  | 2  | 1  | 2  |
|   | 3  | 8  | 6  | 16 | 0  | 10 |

Here, 1 2 1 2 1 2 are values for weighting the individual items, and from the results of the calculation, $3 + 8 + 6 + 1 + 6 + 0 + 1 + 0 = 25$ is obtained. From this result, a greater multiple of 10 nearmost to 25 is determined as 30, and then a calculation $30 - 25 = 5$ is effected. As a result, the check digit is determined as "5".

While the conventional method is as described above, the present invention will be described below.

In the present embodiment, the character C6 is used as a manual check digit MC/D. In particular, the bar codes become as follows:

C1, C2, C3, C4, C5, MC/D, C/D

The codes are defined as follows: "MC/D" is a "manual check digit" as described hereinabove.

Meanwhile, "C/D" is a "total check digit" determined by the calculations of the aforementioned data items "C1, C2, C3, C4, C5" MC/D.

In addition, a recalculated check digit obtained by automatic calculations of the aforementioned data items "C1, C2, C3, C4, C5" is represented as "N".

In order to better understand the calculations described above, an example will now be given based on the assumption that new codes in the present embodiment are "3 4 6 8 0". In this case, the first 5 figures are the same as in the above described calculations, based on the prior art, but in fact they are a completely independent value. Now, in such codes, a value which meets a following equation $$MC/D = N$$

is found. That is, the value is automatically calculated based on a plurality of digits.

|   | C1 | C2 | C3 | C4 | C5 |
|---|----|----|----|----|----|
|   | 3  | 4  | 6  | 8  | 0  |
| × | 1  | 2  | 1  | 2  | 1  |
|   | 3  | 8  | 6  | 16 | 0  |

From the results of these calculations, $3 + 8 + 6 + 1 + 6 + 0 = 24$ is obtained, and from the result of the calculation, a greater multiple of 10 nearmost to 24 is determined as 30, and hence $30 - 24 = 6$ is obtained. As a result, the check digit is determined as "6". Thus, a manually entered check digit is compared to a calculated check digit for equality to detect an error.

In actual operations, an operator will operate ten numeral keys to input numerals as 3 4 6 8 0 6. Then, the value "6" which has been manually inputted is compared with the value "6" as a recalculated check digit N to be automatically calculated, and if they coincide with each other, it is determined that there is no input error in inputs of "3 4 6 8 0", and on the contrary if they do not coincide with each other, it is determined that there is an input error or errors.

The contents of the RAM 16 will be described in reference to FIG. 3. In particular, below a data area, there are provided a bar code area containing C1, C2, ..., a total check digit (C/D) area containing Cn, and a recalculated check digit N area containing AC, and further below those areas, there are provided, in order, a manual input area I1, I2, ..., a manual check digit area AI, and areas for an error flag ERRF, an issue requirement met flag ISSUOKF, an initial flag INITF, a set flag SETF, an issue flag REGF, a count flag COUNTF, a department flag DPF, and a price flag PRICF.

Figure 4:
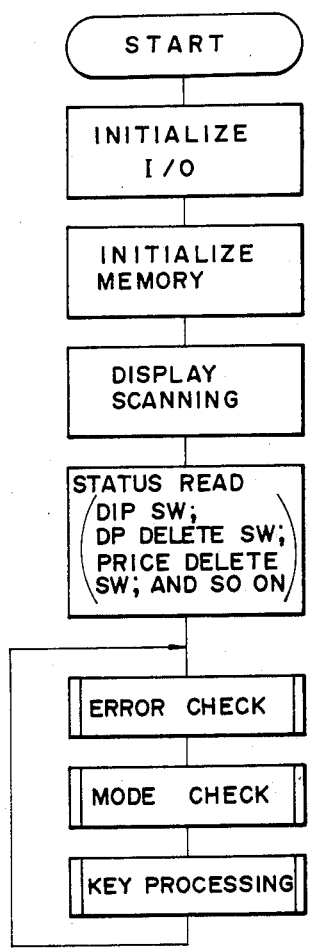
FIG. 4 is a flow chart of a main flow.

A description will be given of the operations of the bar code printer 1 in reference to FIGS. 4 to 10. At first, a main flow is shown in FIG. 4. After initialization of I/Os, a memory is initialized, and then after the display section 6 is scanned, status reading, that is, reading of dip switches and so on, is effected. Thereafter, error checking, mode checking and key processing are effected in order.

Figure 5:
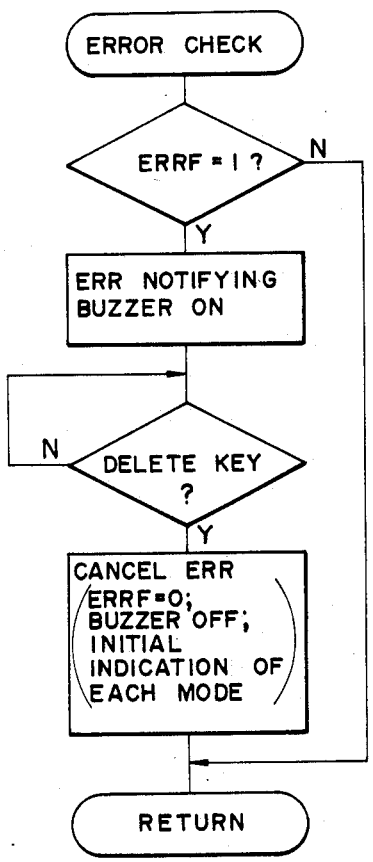
FIG. 5 is a flow chart for error checking.

In the process of error checking, if an error flag occurs as seen in FIG. 5, the buzzer 17 is operated until the delete key is depressed. When the delete key is depressed, the error flag is reset to 0 and the buzzer 17 is stopped to cancel the error.

Figure 6:
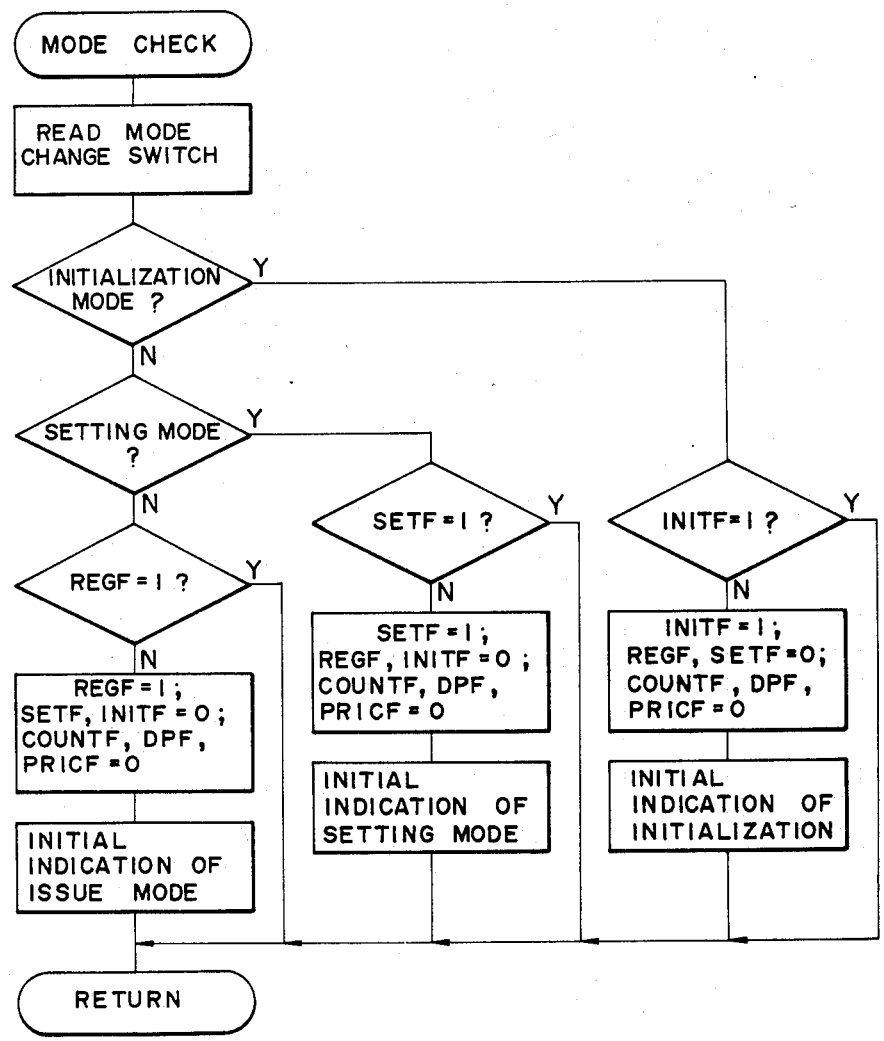
FIG. 6 is a flow chart for mode checking.

Meanwhile in the process of mode checking, as seen in FIG. 6, a change-over switch is read, and if it is in an initial set mode, an initial flag (INITF) is set and the initial setting is initially indicated. If it is in a setting mode, the set flag (SETF) is set and the setting mode is initially indicated. Otherwise, if it is in the issue mode, an issue flag (REGF) is set and the issue mode is initially indicated.

A routine for key processing will be described in reference to FIGS. 7a–7c. If a key is depressed, key processings for the ten numeral keys, clear key, issue number key, execution key, registration key, fixed quantity issue key, issue key, department key, price key and some other keys will be effected in order. A description of the ten keys and the clear key will be given hereinbelow.

At first, if the issue number key is depressed, the counter flag (COUNTF) is set and the department flag (DPF) and the price flag (PRICF) are reset to 0. And then, control returns.

If the execution key is depressed, operations of the issue mode, setting mode and initial mode are effected, and control returns.

If the registration key is depressed, registering operation and operation for setting the initial flag are effected.

If the fixed quantity issue key is depressed, then if requirements for issue are met, label issuing as hereinafter described is effected, but otherwise, various operations upon initial setting are effected.

Also when the issue key is depressed, the label issuing as hereinafter described is effected.

If the department key is depressed, the department flag (DPF) is set, but otherwise if the price key is depressed, the price flag (PRICF) is set, and then control returns.

Figure 7A:
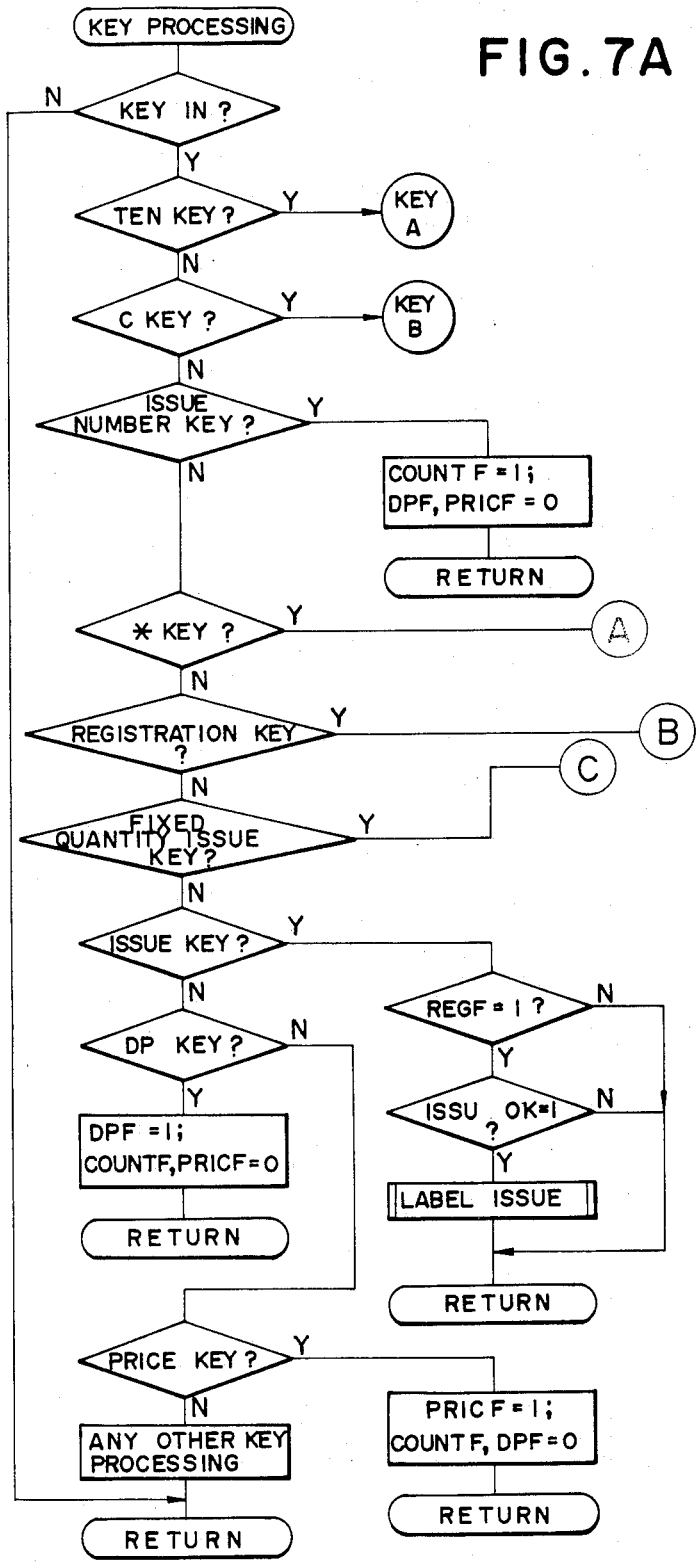
FIGS. 7a–7c are flow charts for key processing.
Figure 7B:
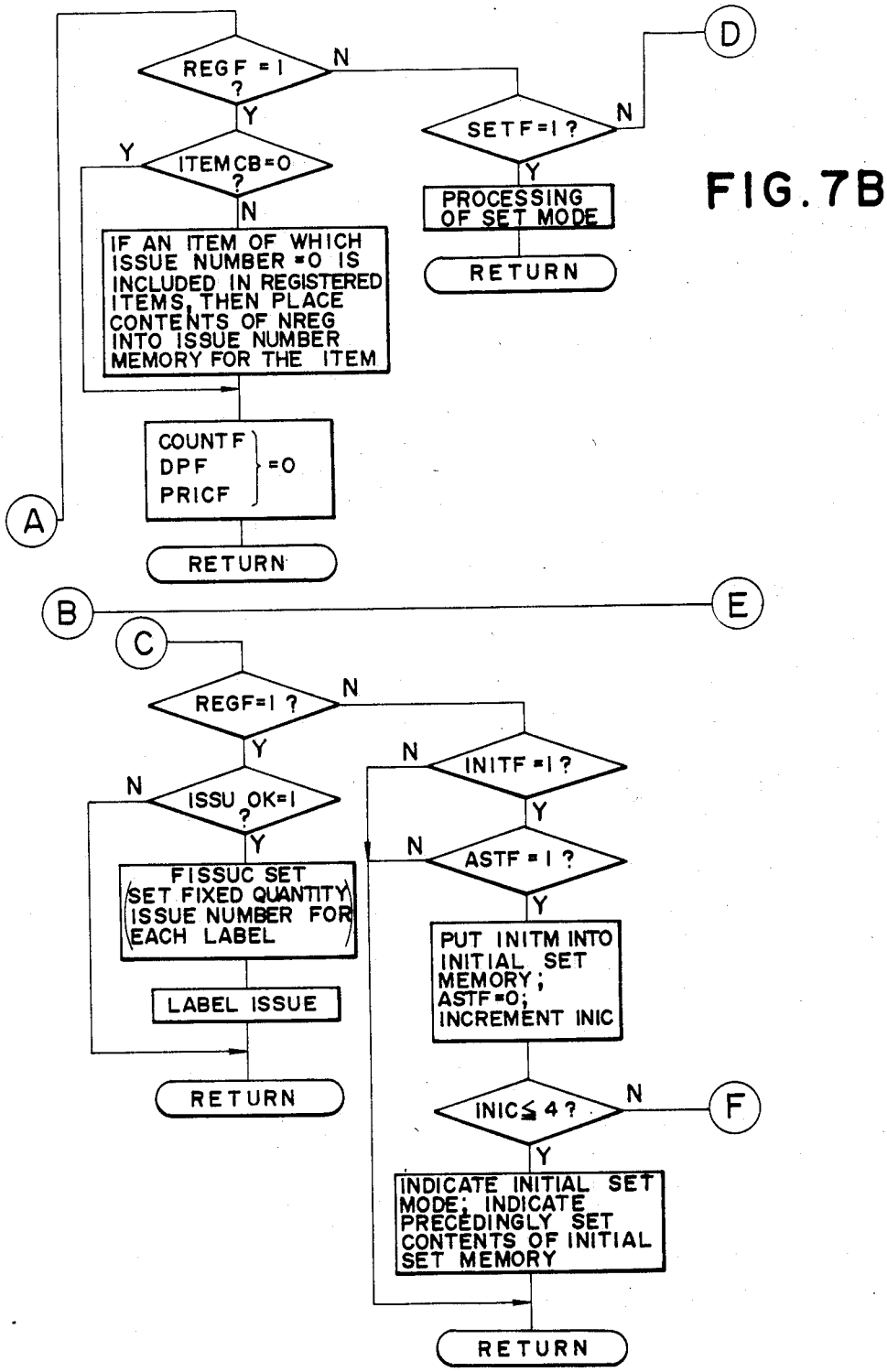
Figure 7C:
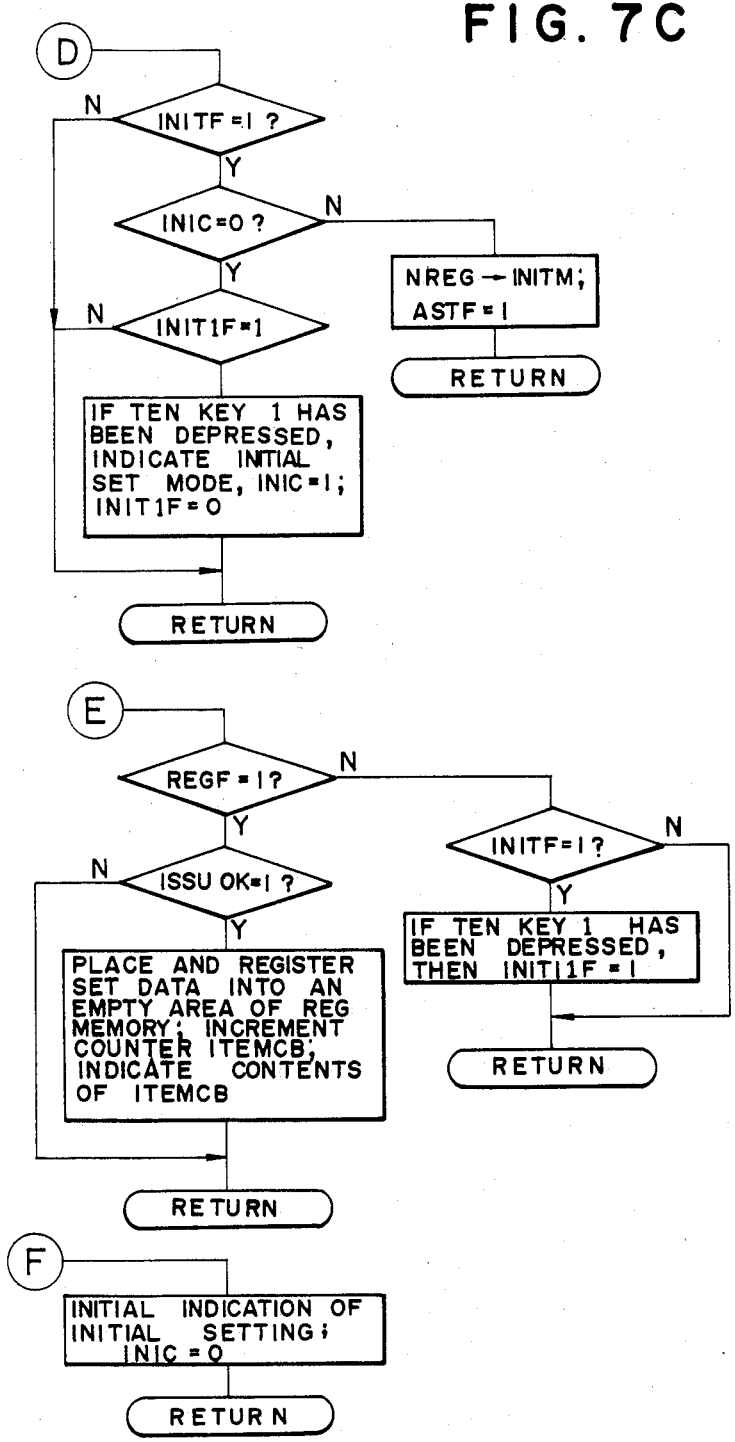
Figure 8A:
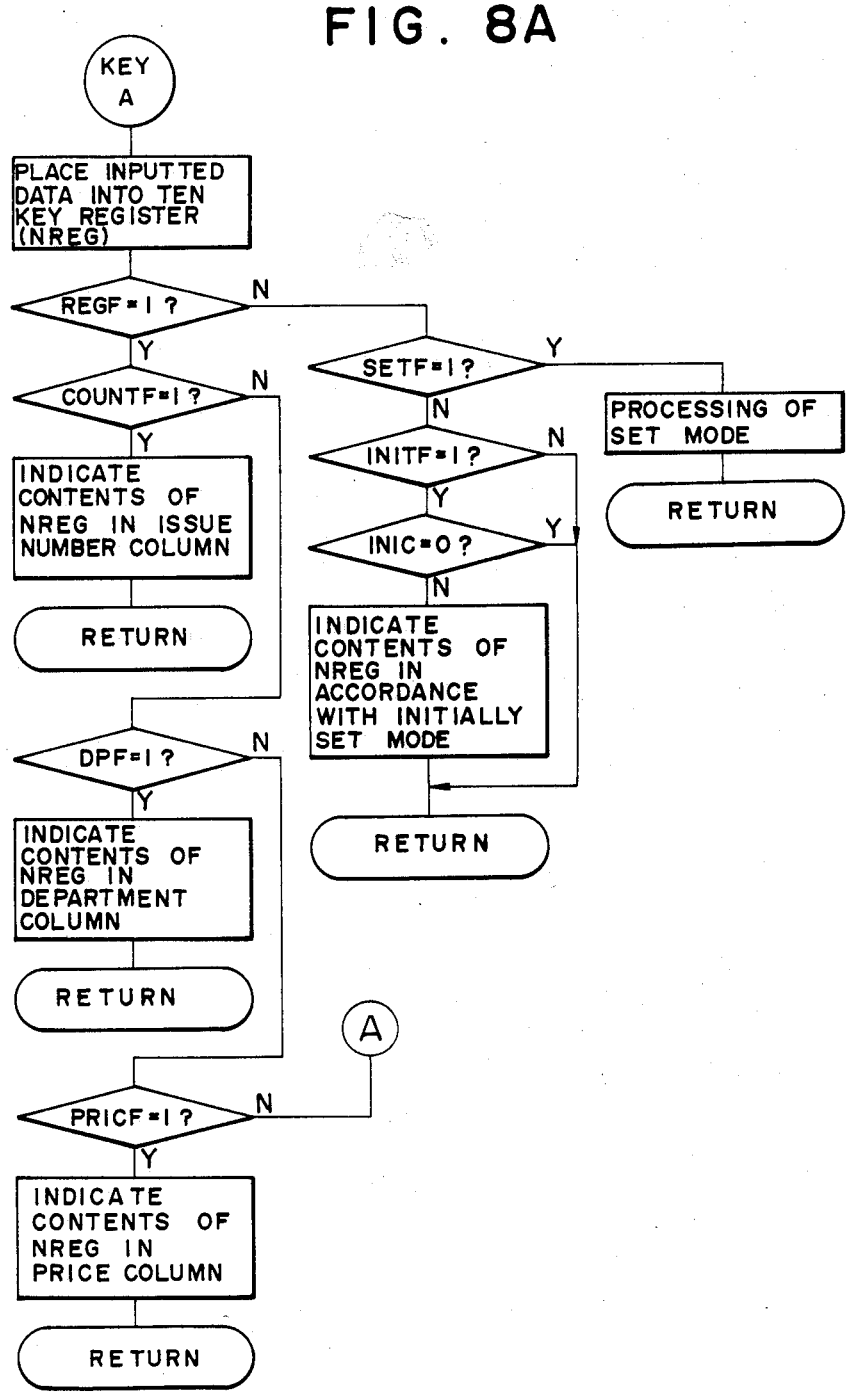
FIGS. 8a and 8b are flow charts upon operation of a ten key.
Figure 8B:
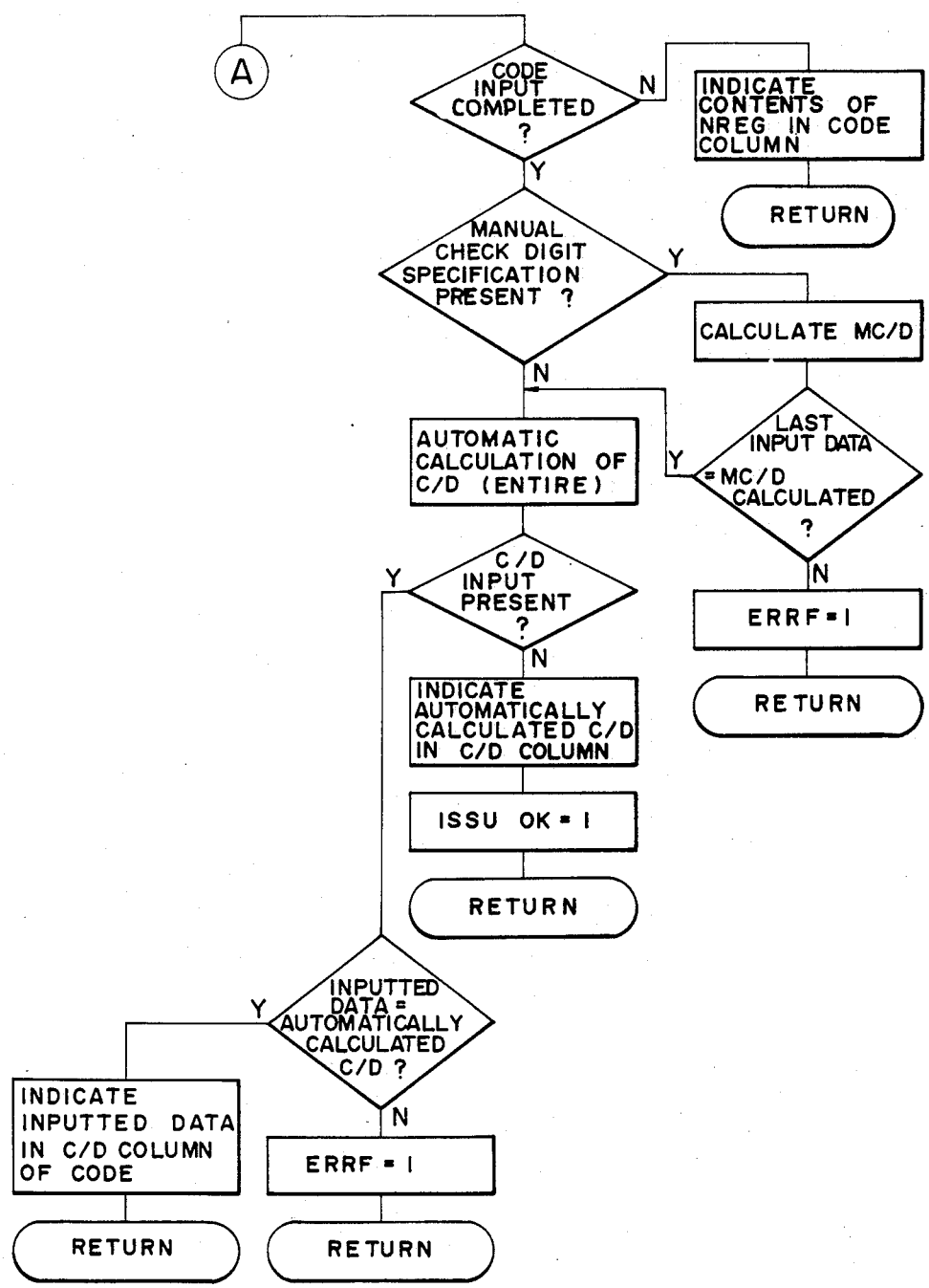

However, if any of the ten keys are depressed in FIGS. 7a–7c, the operation shown in FIGS. 8a and 8b is effected. At first, input data is put into a ten key register (NREG), and then if REGF=1 is not met and SETF=1 is met, processing for the set mode is effected, and then control returns. However, when the SETF=1 is not met and INITF=1 is met, then the initial counter is reset to 0, and the contents of the ten key register is indicated in accordance with the initially set mode. Thereafter, control returns.

Meanwhile, when REGF=1 and the counter flag (COUNTF) stands, the contents of the ten key register are indicated and a column for the issue number, and then control returns. When otherwise COUNTF=1 is not met, then the department flag DPF is checked. And if this flag stands, then the contents of the ten key register are indicated in a column for the department. But if DPF=1 is not met and the price flag (PRICF) stands, then the contents of the ten key register are indicated in a column for the price, and then control returns. If otherwise PRICF=1 is not met and code inputting is not yet completed, then the contents of the ten key register are indicated one after another in a column for the code. But if code inputting is completed, it is determined whether the specifications for the manual check digit are present, and if there are such specifications, then the aforementioned calculations for the manual check digit are effected. Then, the resultant value is compared with the finally inputted data, and if they are not equal to each other, an error flag is set, but on the contrary if they are equal to each other, automatic calculations for a check digit for the entirety are effected.

Here, a check is made to determine if there is an input of a check digit or not, and if it is determined that there is an input, a check is made to determine the input data is equal to the data obtained by the automatic calculations or not. This check is a check of the last figure which is conventionally conducted. If they are not equal to each other, then the data was erroneous, but on the contrary if they are equal to each other, then the input data is indicated in a column for the check of a code, and then control returns. On the other hand, if there is no input of a check digit, the check digit obtained by the automatic calculations is indicated in the column for the ckeck digit of a code, and then as it is determined that the issue requirements are met (ISSUOK=1), control returns.

Figure 9:
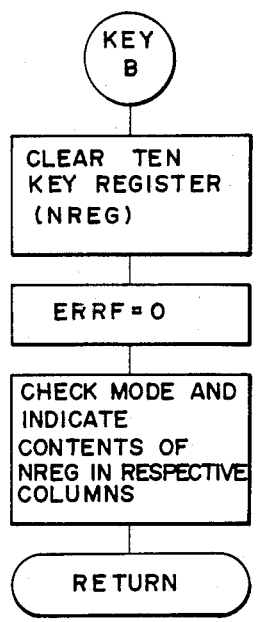
FIG. 9 is a flow chart upon operation of a clear key.

FIG. 9 illustrates operations when the clear key is depressed. At first, the ten key register is cleared, and then ERRF is reset to 0, whereafter the mode is checked, and the contents of the ten key register are indicated in respective indicating columns. Then, control returns.

Figure 10:
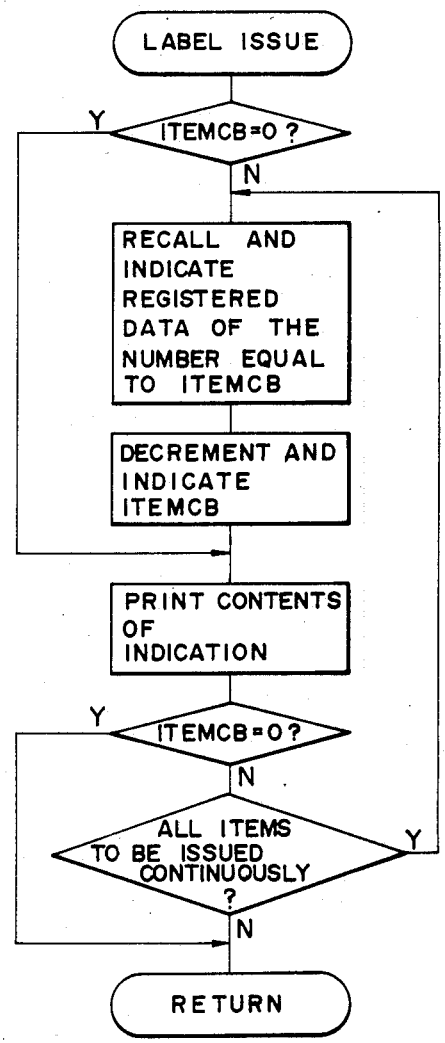
FIG. 10 is a flow chart for label issuing.

In addition, FIG. 10 illustrates a routine for label issuing. At first, it is checked if ITEMCB=0 is met, and if ITEMCB is 0, then the contents of the indication are printed out, but on the contrary if ITEMCB is not 0, registered data of the same number with the item are recalled and indicated, and then ITEMCB is decremented and the contents of the indication are printed out. Then, if ITEMCB=0, then control returns, but otherwise if ITEMCB is not 0, then depending upon whether or not all the items are to be continuously issued, selection is made if continuous issuing is to be effected or if control is to return directly.

What is claimed is:

1. The method of confirming bar code information which is input to a bar code printer where the bar code information is in accordance with a bar code version, comprising the step of:

manually inputting said bar code information including a plurality of digits and a first check digit;

automatically calculating a value based on said plurality of digits;

comparing said first check digit and said value to determine if they are equal and to confirm that errors are not present in said bar code information;

automatically calculating a second check digit based on said bar code information, if said first check digit is equal to said value, wherein said second check digit is a check digit for checking whether the bar code as read is correct;

storing said first check digit, said second check digit and said value in a RAM having a first check digit area, a second check digit area and a value area; and printing a label containing said bar code information and said second check digit.

2. A device for confirming bar code information input to a bar code printer where said bar code information is in accordance with a bar code version, said device comprising:

means for inputting said bar code information including a plurality of digits and a first check digit;

means for automatically calculating a value based on said plurality of digits;

means for comparing said first check digit and said value to determine whether said first check digit is equal to said value and to confirm that errors are not present in said bar code information;

means for automatically calculating a second check digit based on said bar code information if said first check digit is equal to said value, wherein said second check digit is a check digit for checking whether the bar code as read is correct;

a RAM having a first check digit area for storing said first check digit, a second check digit area for storing said second check digit and a value area for storing said value;

means for printing a label containing said bar code information and said second check digit.

* * * * *

UNITED STATES PATENT AND TRADEMARK OFFICE
CERTIFICATE OF CORRECTION

PATENT NO. : 4,742,521

DATED : May 3, 1988

INVENTOR(S) : Manabu NISHIDA

It is certified that error appears in the above-identified patent and that said Letters Patent is hereby corrected as shown below:

On the Title Page, and in Column 1, Line 2, the word "CORD" in the title should be changed to "CODE".

Signed and Sealed this

Twenty-fifth Day of October, 1988

Attest:

DONALD J. QUIGG

Attesting Officer

Commissioner of Patents and Trademarks